United States Patent [19]

Meyer et al.

[11] Patent Number: 4,611,034

[45] Date of Patent: Sep. 9, 1986

[54] BRANCHED THERMOPLASTICALLY PROCESSIBLE IMPACT-RESISTANT POLYAMIDES

[75] Inventors: Rolf-Volker Meyer; Friedrich Fahnler; Rolf Dhein; Dietrich Michael, all of Krefeld; Kurt Weirauch, Bergisch Gladbach; Walter Schäfer, Cologne, all of Fed. Rep. of Germany

[73] Assignee: Bayer Aktiengesellschaft, Leverkusen, Fed. Rep. of Germany

[21] Appl. No.: 749,999

[22] Filed: Jul. 1, 1985

[30] Foreign Application Priority Data

Jul. 10, 1984 [DE] Fed. Rep. of Germany ....... 3425318

[51] Int. Cl.[4] ........................................... C08F 283/04
[52] U.S. Cl. .................................................... 525/420
[58] Field of Search ......................................... 525/420

[56] References Cited

U.S. PATENT DOCUMENTS

| | | | |
|---|---|---|---|
| 3,657,385 | 4/1972 | Matzner et al. | 525/420 |
| 3,923,925 | 12/1975 | Schneider et al. | 525/420 |
| 3,946,089 | 3/1976 | Furukawa et al. | 525/420 |
| 3,993,709 | 11/1976 | Hendrick et al. | 525/425 |
| 4,031,164 | 6/1977 | Hendrick et al. | 525/425 |
| 4,374,741 | 2/1983 | Rieder | 525/420 |
| 4,376,856 | 3/1983 | Tanaka et al. | 525/420 |
| 4,429,081 | 1/1984 | Mumcu et al. | 525/420 |
| 4,487,920 | 12/1984 | Akkapeddi | 525/420 |
| 4,507,465 | 3/1985 | Chiba et al. | 525/420 |

FOREIGN PATENT DOCUMENTS

| | | | |
|---|---|---|---|
| 59-193923 | 11/1984 | Japan | 525/420 |
| 60-028431 | 2/1985 | Japan . | |
| 1067153 | 5/1967 | United Kingdom . | |

*Primary Examiner*—Joseph L. Schofer
*Assistant Examiner*—N. Sarofim
*Attorney, Agent, or Firm*—Connolly & Hutz

[57] ABSTRACT

Polyamide block copolymers obtained by activated anionic polymerization of lactams having at least 5 ring members in the presence of basic catalysts, polyisocyanates as activators and amino-terminated polyethers, which are characterized in that the amino-terminated polyethers have a functionality of at least 3.0 preferably at least 3.2, and a molecular weight of at least 3500, and the polyisocyanates are aliphatic or cycloaliphatic polyisocyanates.

7 Claims, No Drawings

BRANCHED THERMOPLASTICALLY PROCESSIBLE IMPACT-RESISTANT POLYAMIDES

This invention relates to impact-resistant polyamides which are thermoplastically processible in spite of a relatively high content of higher functional block segments and to the production thereof by activated anionic polymerisation of lactams.

The production of polyamides by activated anionic polymerisation of lactams has been known for a long time and is used for producing a wide range of consumer goods, such as fuel oil battery tanks, tubes of various lengths and diameters, rollers and gear wheels.

Although these polyamides are distinguished by satisfactory rigidity and by very good self-lubrication properties they are less suitable for applications in which high impacts are involved. Polyamides in general and the polyamides produced by activated anionic polymerisation of lactams in particular have a tendency to brittle fracture and are notch sensitive, particularly at low temperatures.

Conventional methods, such as thorough mixing with suitable rubber components, do not improve the low temperature impact resistance of polyamides produced by anionic polymerisation of lactams because of the elastifying components are insufficiently compatible with the reactive alkaline lactam melts and phase separation immediately occurs.

The use of polyols, preferably of polyethylene polyols having a high molecular weight polyol content and low OH number, leads to a gradual improvement in the impact strength, but also to undesirable plasticization and to an excess monomer extract content as the OH groups may have an adverse effect on polymerisation.

In the GB-PS No. 1,067,153 a process for producing polyamides having improved impact strength by anionic polymerisation of lactams is described, in which a polyurethane prepolymer having terminal NCO groups obtained by reaction of diisocyanates with the OH groups of polyethers is used as activator.

This process yields only a moderate improvement of the impact strength, but a much increased lactam monomer content. The stability of NCO prepolymers on storage, in particular the viscosity stability thereof, is also critical. According to DOS No. 2,527,885, polyether polyester blocks are produced from polyether polyols and dicarboxylic acids or derivatives thereof and are then reacted with lactams in the presence of organometallic catalysts by anionic polymerisation to form block terpolymers.

However, the production of these products is time consuming as several reaction stages are required and the anionic polymerisation is only successfuly by using Grignard catalysts which are very difficult to produce and handle industrially.

Similar products are described in U.S. Pat. No. 4,031,164, obtained by using (poly)acyl lactams, such as terephthaloyl-bis-caprolactam, which makes the production also complicated.

In the EP No. 0 099 560 a process for producing polyamides having improved impact strength is disclosed, wherein lactams are reacted with polyoxyalkylene diamines to form block copolymers. Polyoxyalkylene triamines from trimethylolpropane may also be used.

Although these block copolymers may be produced without Grignard catalysts and have a better impact strength than unmodified 6-polyamide, they do not meet the high requirements of impact resistance, and notched impact strength particularly at low temperatures.

These high values are required, in particular, for external parts in the car industry.

There is therefore a need for polyamides and polyamide shaped articles which are highly impact resistant even at low temperatures, which have good impact strength and notched impact strength values at temperatures of from 0° to −40° C., in addition to the satisfactory stability to thermal moulding and which may easily be produced on an industrial scale.

It has surprisingly been found that such products which do not have the above-mentioned disadvantages are obtained when ω-lactams and polyethers containing terminal amino groups are polymerised in the presence of alkaline catalysts and polyfunctional activators, preferably polyisocyanates, the polyethers having a functionality of at least 3.0, preferably at least 3.2, and a molecular weight of >3000, preferably from 4000 to 10000.

The present invention therefore relates to polyamide block copolymers obtained by activated anionic polymerisation of lactams having at least 5 ring members in the presence of alkaline catalysts, polyisocyanates as activators and amino-terminated polyethers, wherein the amino-terminated polyethers have a functionality of at least 3.0, preferably at least 3.2, and a molar weight of >3000 preferably at least 3500 and the polyisocyanates are aliphatic polyisocyanates.

As polyethers having terminal amino groups, it is preferable to use polyethers corresponding to the following general formula (I):

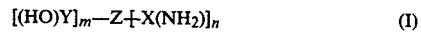

$$[(HO)Y]_m-Z+X(NH_2)]_n \quad (I)$$

wherein Z represents an n+m valent hydrocarbon radical which is optionally bound via one or more O-bridges, with m=0-2, n=2-8, preferably 3-6, and n+m=3-8, preferably 3.2-6; and X represents a polyether radical containing P times a structural unit corresponding to the following general formula (II)

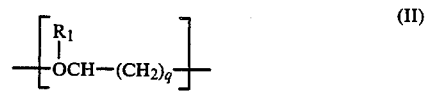

$$-\left[OCH-(CH_2)_q\right]_{\substack{R_1}}^{} - \quad (II)$$

wherein
$R_1$ represents H or a $C_1$-$C_3$ alkyl radical;
q represents an integer of from 1 to 5, preferably from 1 to 3; and
p is at least 15;
Y may have the meaning of X or may represent a chemical bond;
and wherein in the case of polyether mixtures; n≧2 m, preferably n≧5 m.

The amino-terminated polyethers to be used according to the present invention may be produced in known manner, for example by amination of the corresponding OH-polyethers with ammonia. The polyethers required for the amination reaction are also known products which are produced in known manner by alkoxylation of relatively low molecular weight polyols or polyamines or amino-alcohols, such as glycerin, trimethylolethane, trimethylopropane, 1,2,4-butane-triol, 1,2,6-hexane-triol, pentaerythritol, α,α'-bis(dimethylolpropane)-dimethyl ether, sorbitol, saccharose, triethanolamine, triisopropanolamine, 1,3,5-trimethylamino-cyclohexane, 4-(30',4'-diaminocyclohexyl)-cyclohexylamine, 1,5,9-triamino-cyclododecane, trimethylamino-cyclododecane isomer mixtures, hydrogenation products of higher than 2-nuclear polyamines of the diphenyl methane series, polyalkylene polyamines, 1,13-diamino-7-azatridecane, bis-methylamino-hydroxymethyl-cyclododecane, with $C_2$–$C_4$ alkylene oxides, such as ethylene oxide, propylene oxide, 1,2-butylene oxide and/or with tetrahydrofuran, wherein the polyether chains may be homopolymer, statistical copolymer and/or also segment copolymer.

Polyethers made up completely or partially of hexanediol-1,6 are also suitable.

Amino-terminated polyethers which have been obtained from glycerin, trimethylolpropane, pentaerythritol, α-α'-bis-(dimethylolpropane)dimethyl ether and sorbitol are preferably used.

Propylene oxide and tetrahydrofuran are preferably used predominantly for buidling up the polyether chains.

The degree of amination of the amino-terminated polyethers to be used according to the present invention is at least 60%, preferably ≧85%, more preferably ≧95%.

The molecular weights of the polyethers to be used according to the present invention are preferably at least 3500, more preferably 4000 to 10000. The amino-terminated polyethers to be used according to the present invention may be used individually and in mixtures. Polyethers based on sorbitol and saccharose are used preferably in mixtures with components of lower functionality as they are easier to produce.

ε-caprolactam and lauryl lactam are preferably used, particularly ε-caprolactam as ω-lactams having at least 5 ring members.

Various alkaline catalysts known from the anionic polymerisation of lactams may be used in conventional quantities, such as alkali metal and alkaline earth metal lactamates, preferably Na-caprolactamate, alkali metal and alkaline earth metal alcoholates, hydrides and carbonates, preferably the Na-compounds. It is particularly preferable to use Na-caprolactamate.

Aliphatic polyisocyanates such as hexamethylene-1,6-diisocyante, isophorone diisocyanate, diisocyanatodicyclohexyl methanes or the corresponding masked compounds, are used as co-catalysts.

Aliphatic di- and poly-isocyanates, hexamethylene diisocyanate and isophorone diisocyanate are preferably used and biuret group-containing, allophanate group-containing and isocyanurate group-containing polyisocyanates based on aliphatic diisocyanates are particularly preferably used.

Co-catalysts which are particularly preferred for the inventive process are besides the allophanate group-containing polyisocyanates based on hexamethylene-1,6-diisocyanate described in DOS No. 2,746,702 the biuret group-containing polyisocyanates produced e.g. as described in the DAS No. 1101394 or DOS No. 2808801. The concentrations of co-catalysts to use increase as the quantity of amino-terminated polyethers increases, generally from 0.2 to 5% by weight preferably from 0.5 to 3% by weight, the total concentration of the co-catalyst functionality being at least equal to the total concentration of $NH_2$ and optionally OH-groups of the polyether.

The amino-terminated polyethers which are to be used according to the present invention for block polymerisation with lactams are used in concentration of from 1 to 40% by weight, preferably from 5 to 25% by weight, based on the total quantity of the reactants.

The products according to the present invention are surprisingly distinguished by considerably improved impact strength, even at low temperatures, in comparison to products having an amino-polyether functionality ≦2.5. The present products are suprisingly thermoplastically processible over wide ranges in spite of the high degree of branching caused by polyfunctionality.

The use of biuret-group containing polyisocyanates especially with 8 to 20% by weight of the amino-terminated polyethers yields polyamides which show very finely dispersed domains in the matrix and have an outstanding improved notched impact strength and heat distortion temperature.

The four necessary components, namely lactam, amino-terminated polyether, catalyst and activator, (co-catalyst) may be mixed with one another in any sequence to produce the polyamide polyether block copolymer.

The amino-terminated polyethers may also be reacted with part of the activator prior to the lactam polymerisation to form a prepolymer, but care should be taken to prevent the viscosity from increasing excessively.

The components are preferably premixed with one another to produce melts which are stable on storage at lower temperature which may then be mixed together in a simple manner by means of metering devices. It is particularly advantageous to distribute the components over two storage containers, one portion of the lactam being mixed and processed with the total quantity of activator and the second portion of the lactam with the amino-terminated polyether and the catalyst.

Polymerisation takes place after thorough mixing of all components at temperatures of from 90° to 300° C., preferably from 100° to 250° C., more preferably from 110° to 160° C. within a few minutes.

If polymerisation is carried out at temperatures below the melting point of the polyamide formed, polymerisation is carried out in a mould from which the finished moulding may be removed after a short time owing to its self-releasing properties.

If polymerisation is carried out at relatively high temperatures, it is advantageous to carry out polymerisation in a screw machine which is particularly preferably equipped with several heating zones with the two specified temperature ranges, from which the polyamide polyether block co-polymer is ejected as a strand after polymerisation, comminuted in known manner to form a granulate and finally thermoplastically shaped to form the desired mouldings, optionally after extraction of monomer fractions.

The polymerisation process is to be carried out according to the present invention may obviously be carried out in the presence of additives, such as reinforced materials, for example, glass fibres, mineral fibres, fillers or nucleation agents providing that they behave in a substantially inert manner with respect to the polymer reaction and do not affect polymerisation.

A combination with glass fibres or fillers, in particular, with the object of further increasing rigidity may be advantageous for many mouldings.

The present invention is particularly suitable for supplying a variety of mouldings, such as sheets, semi-finished products, tubes, hollow bodies and, in particular, flat parts for car assembly by the casting process or by the RIM process.

High quality reinforced sheets may be produced advantageously according to the present invention by reinforcing with carbon fibres or fibres of aromatic polyamides.

Products produced according to the present invention may also be obtained in granulate form, however, with the object of subsequent thermoplastic processing, for example in injection moulding machines.

| | Characterisation of the aminopolyethers |
|---|---|
| (A) | Average functionality: 3.2 (described in Example 1) |
| (B) | Average functionality: 3.5 (described in Example 2) |
| (C) | Average functionality: 4.0 (pentaerythritol, propylene oxide 87% ethylene oxide 13%) Degree of amination: 94% Molecular weight 6400 |
| (D) | Average functionality 4.0 (pentaerythritol, propylene oxide 87%) ethylene oxide 13%) Degree of amination 82% Molecular weight 6400 |
| (E) | Polyethers as in C,D but amination by reaction with isophorone diisocyanate and hydrolysis of the terminal NCO groups (tetrafunctional, 100% aminated) |
| (F) | Polypropylene oxide, bifunctional molecular weight 2,000, 100% aminated |
| (G) | polyether of trimethylolpropane and propylene oxide, molecular weight 2500, functionality: 3, degree of amination 100% |
| (H) | polyether of trimethylolpropane and propylene oxide (100% aminated, molecular weight 7400), by reaction with 1 mol of 4,4'-diisocyanatodiphenyl-methane, tetrafunctionalised, molecular weight about 15,000 |
| (K) | polyether as in C,D, only aminated to 40%. |

The molecular weight specified were determined by analysing the terminal OH content of the starting polyethers.

EXAMPLE 1

65 g of ε-caprolactam, 15 g of an aminopolyether mixture having an average functionality of 3.2, produced by alkoxylation of trimethylolpropane with propylene oxide and subsequent reaction with ammonia under pressure (degree of amination: 100%, molecular weight 4800) and by similar alkoxylation of pentaerythritol and subsequent amination (degree of amination: 95%, molecular weight 6400) and 7.5 g of a 20% solution of Na-caprolactamate in ε-caprolactam are heated under a $N_2$ atmosphere to 115° C. (melt A).

At the same time, in a second storage vessel, 58 g of ε-caprolactam are also heated to 110° C. with 4.5 g of an allophanate-modified polyisocyanate based on hexamethylene diisocyanate (described in DOS No. 2,746,702, Example 2), melt B).

The two melts are simultaneously supplied to a polymerisation vessel heated to 140° C. and throroughly mixed by stirring, polymerisation commencing after only 60 seconds (measurable using a stirrer connected to a viscosimeter), and ending after a further 80 seconds.

A very homogeneous, light-coloured polymer block of typical inherent polyamide colour and a very good surface is obtained. After cooling to −30° C., the block, which is clamped in a vice, cannot be damaged with hammer an chisel.

Samples were cut from the polymer block to determine the mechanical properties thereof.

The extractable lower molecular weight portion (with methanol) is 1.6%. Specific polymer properties are listed in Table 1.

EXAMPLE 2

Example 1 is repeated, except that a mixture of 8 g of a trimethylolpropane polyether (degree of amination 74%, molecular weight 4800) and 7 g of a pentaerythritol polyether with propylene oxide (degree of amination 94%, molecular weight 5600) is used as aminopolyether component, resulting in an average functionality of about 3.5.

After cooling to −30° C., the polymer block obtained could not be damage according to Example 1. The monomer content which may be extracted with methanol (only ε-caprolactam) is 1.9%.

Some polymer properties are given in Table 1.

EXAMPLES 3 TO 7

As in the experiment according to Example 1, various amino-terminated polyethers having varying terminal groups, functionality, molecular weight, concentration of polyether in the total mixture were used.

The characteristic compositions of the test mixtures and the properties of the polymers obtained are set out in Table 1.

EXAMPLE 8-13

As in the experiment according to Example 1 various polyisocyanate activators I–IV in combination with different amounts of amino-terminated polyethers as set forth in Example 1 were used.

The characteristic compositions of the test mixtures and the properties of the polymers obtained are set out in Table 2.

Activator I:

Biuret-groups containing polyisocyanate of basic hexamethylene diisocyanate having a viscosity of about 11000 mPa.s at 23° C. and a NCO-content of 22% (Desmodur N 100 ®, Bayer AG).

Activator II:

As activator I but having a viscosity of about 2500 mPa.s at 23° C. and a NCO-content of 23% (Desmodur N 3200 ®, Bayer AG).

Activator III:

A biuret-group containing polyisocyanate of basic isophorondiisocyanate according to example 12 of the DOS No. 2808801.

Activator IV:

A biuret-group containing polyisocyanate of basic tetramethylene diisocyanate according to example 4 of the DOS No. 28 08801.

TABLE 1

| | Composition in %, by weight | | | | | | |
|---|---|---|---|---|---|---|---|
| Example | 1 | 2 | 3 | 4 | 5 | 6 | 7 |
| ε-caprolactam | 82.5 | 77.0 | 82.5 | 77.0 | 71.5 | 77.0 | 77.0 |
| Catalyst$^{(x)}$ | 5 | 5 | 5 | 5 | 5 | 5 | 5 |
| Activator$^{(x)}$ | 2.5 | 3.0 | 2.5 | 3.0 | 3.5 | 3.0 | 3.0 |
| Amino-       A | 10 | | | | | | |
| polyether   B | | 15 | | | | | |
|              C | | | 10 | | | | |
|              C | | | | 15 | | | |
|              C | | | | | 20 | | |
|              D | | | | | | 15 | |
|              E | | | | | | | 15 |
| Properties: | | | | | | | |
| Monomer | 1.6 | 1.9 | 1.1 | 2.1 | 2.2 | 2.2 | 2.9 |

TABLE 1-continued

| Example | Composition in %, by weight | | | | | | |
|---|---|---|---|---|---|---|---|
| | 1 | 2 | 3 | 4 | 5 | 6 | 7 |
| extract (%) | | | | | | | |
| $a_k$ (23° C.) (kJ/m$^2$) | 27.6 | 36.4 | 32.4 | 41.6 | 50.8$^{(a)}$ | 32.5 | 36.4 |
| $a_n$ (−40° C.) | 80 | n.b. | n.b. | n.b. | n.b. | n.b. | n.b. |

$^{(x)}$as described in Example 1
$^{(a)}$beginning to break
n.b. = not broken

TABLE 2

| Example | Composition in % by weight | | | | | |
|---|---|---|---|---|---|---|
| | 8 | 9 | 10 | 11 | 12 | 13 |
| ε-caprolactam | 81.7 | 77.6 | 77.2 | 77.7 | 76.7 | 77.9 |
| Catalyst$^{(x)}$ | 4 | 5 | 5 | 5 | 5 | 5 |
| Activator I | 2.3 | 2.4 | 2.8 | — | — | — |
| Activator II | — | — | — | 2.3 | — | — |
| Activator III | — | — | — | — | 3.3 | — |
| Activator IV | — | — | — | — | — | 2.4 |
| Aminopolyether A | 12 | 15 | 20 | 15 | 15 | 15 |
| properties | | | | | | |
| $a_k$ (23° C., kJ/m$^2$) | 57$^{(a)}$ | 70$^{(a)}$ | 64$^{(a)}$ | 53$^{(a)}$ | 45$^{(a)}$ | 60$^{(a)}$ |
| $a_k$ (−20° C., kJ/m$^2$) | 21 | 38$^{(a)}$ | 39$^{(a)}$ | 35$^{(a)}$ | 27 | 32$^{(a)}$ |
| ball pressure hardness (N/mm$^2$) | 85 | 75 | 63 | 86 | 72 | 79 |

$^{(x)}$as described in example 1
$^{(a)}$beginning to break

COMPARISON TESTS A TO D

As in the experiment in Example 1, various comparison tests not in accordance with the present invention were carried out.

As shown by the formulations and test results quoted in Table 3, the products obtained in the comparison tests are not nearly as good as the polyether block copolyamides according to the present invention.

TABLE 3

| | comparison tests | | | |
|---|---|---|---|---|
| | Composition in % by weight | | | |
| Test | A | B | C | D |
| ε-caprolactam | 76.5 | 77.0 | 77.5 | 77.0 |
| Catalyst$^{(x)}$ | 5.0 | 5.0 | 5.0 | 5.0 |
| Activator$^{(x)}$ | 3.5 | 3.0 | 2.5 | 3.0 |
| Aminopolyether F | 15 | — | — | — |
| G | — | 15 | — | — |
| H | — | — | 15 | — |
| K | — | — | — | 15 |
| Monomer extract (%) | 3.3 | 2.5 | 3.2 | 9.8 |
| $a_k$ (23° C.) (kJ/m$^2$) | 2.5 | 5.2 | 13.3 | 8.4 |
| $a_n$ (−40° C.) (kJ/m$^2$) | 8.5 | 8.8 | n.d. | n.d. |

$^{(x)}$as described in Example 1
n.d. = not determined

EXAMPLES 1a TO 7a

On an apparatus for producing semi-finished sheets, it is possible to produce polymer sheets by charging the sheet tool batch-wise with the two described melts (A+B) from storage containers heated to 90° C. and by mixing the melts using a 3-way cock before they enter the tool, and the melts using a 3-way cock before they enter the tool, and the polymer sheets may be released from the mould without difficulty in spite of the large surface area of these mouldings which exhibit a very good surface quality and whose mechanical properties correlate very well with those measured on samples according to Examples 1 to 7.

EXAMPLE 14

50 kg batches of the melts according to Example 2 are placed in storage containers heated to 90° C. Using suitable metering pumps, the melts are conveyed in a mixing ratio according to Example 1 into the inlet nozzle of a double shaft extruder which is divided into several heating zones (entry zone: 80° C., first zone: 120° C., second zone: about 200° C., third zone: 260° C., outlet).

With a throughput of 24 kg per hour, a strand of plastics material which could be comminuted into a granulate in the manner of polyamide was delivered at the extruder outlet.

The monomer extract was 11.0% (only ε-caprolactam).

The extracted and thoroughly dried granulate may be processed without difficulty on injection moulding machines into easily released moulding compositions which have a very high notched bar impact value at room temperature (72 kJ/m$^2$).

Breakage did not occur when measuring the impact resistance at −40° C.

We claim:

1. A polyamide block copolymer obtained by the activated anionic polymerisation of a lactam having at lease five ring members in the presence of a basic catalyst, a polyisocyanate co-catalyst and an amino-terminated polyether having a degree of amination of at least sixty percent, a functionality of at least 3 and a molecular weight of >3000.

2. Polyamide polyether block copolymer as claimed in claim 1 wherein the co-catalyst is an aliphatic or cycloaliphatic polyisocyanate.

3. Block copolymers as claimed in claim 1 or claim 2 wherein the polyether has a functionality of at least 3.2.

4. Block copolymer as claimed in any of claims 1 to 3 wherein the polyether has a molecular weight of from 4000 to 10000.

5. Block copolymers as claimed in any of claims 1 to 4 wherein from 1 to 40%, by weight, based on the reactants, of polyether is used.

6. Block copolymers as claimed in claim 5 wherein from 5 to 25%, by weight, is used.

7. Block copolymers as claimed in any of claims 1 to 6 wherein the polyether corresponds to the following general formula:

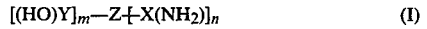

$$[(HO)Y]_m-Z+X(NH_2)]_n \quad (I)$$

wherein

Z represents an (n+m)-valent hydrocarbon radical which may be linked via one or more -O- bridges;
m represents from 0 to 2 and n represents from 2 to 8, such that (n+m) represents from 3 to 8;
X and Y independently represent a polyether radical containing at least 15 recurrent structural units corresponding to the following general formula:

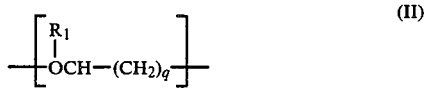

$$-\left[\begin{array}{c} R_1 \\ | \\ OCH-(CH_2)_q \end{array}\right]- \quad (II)$$

wherein
R$^1$ represents hydrogen of C$_1$–C$_3$ alkyl;
and
q represents from 1 to 5; or Y represents a bond;
provided that, in the case of a mixture, n≧2 m.

* * * * *